(12) United States Patent
Kolosnitsyn et al.

(10) Patent No.: US 7,695,861 B2
(45) Date of Patent: Apr. 13, 2010

(54) LITHIUM SULPHIDE BATTERY AND METHOD OF PRODUCING THE SAME

(75) Inventors: Vladimir Kolosnitsyn, Ufa (RU); Elena Karaseva, Ufa (RU)

(73) Assignee: Oxis Energy Limited, Abingdon (GB)

( * ) Notice: Subject to any disclaimer, the term of this patent is extended or adjusted under 35 U.S.C. 154(b) by 142 days.

(21) Appl. No.: 11/386,113

(22) Filed: Mar. 22, 2006

(65) Prior Publication Data

US 2006/0234126 A1 Oct. 19, 2006

Related U.S. Application Data

(60) Provisional application No. 60/664,592, filed on Mar. 24, 2005.

(30) Foreign Application Priority Data

Mar. 22, 2005 (GB) ................................. 0505790.6

(51) Int. Cl.
*H01M 6/04* (2006.01)
*H01M 10/00* (2006.01)
*H01M 2/14* (2006.01)

(52) U.S. Cl. ........................ 429/188; 429/122; 429/129

(58) Field of Classification Search .................. 492/129, 492/231.95
See application file for complete search history.

(56) References Cited

U.S. PATENT DOCUMENTS

| | | | |
|---|---|---|---|
| 3,185,590 A | 5/1965 | Mayer et al. | |
| 3,578,500 A | 5/1971 | Maricle et al. | |
| 3,639,174 A | 2/1972 | Kegelman | |
| 3,778,310 A | 12/1973 | Garth | |
| 3,877,983 A | 4/1975 | Hovsepian | |
| 3,907,597 A | 9/1975 | Mellors | |
| 4,060,674 A | 11/1977 | Klemann et al. | |
| 4,104,451 A | 8/1978 | Klemann et al. | |
| 4,118,550 A | 10/1978 | Koch | |
| 4,154,906 A * | 5/1979 | Bubnick et al. | ............... 429/94 |
| 4,163,829 A | 8/1979 | Kronenberg | |
| 4,218,523 A | 8/1980 | Kalnoki-Kis | |
| 4,252,876 A | 2/1981 | Koch | |

(Continued)

FOREIGN PATENT DOCUMENTS

CN 1503385 A 6/2004

(Continued)

OTHER PUBLICATIONS

Merriam Webster's, Collegiate Dictionary (10th Edition).*

(Continued)

*Primary Examiner*—Dah-Wei D Yuan
*Assistant Examiner*—Adam A Arciero
(74) *Attorney, Agent, or Firm*—Pearl Cohen Zedek Latzer, LLP

(57) ABSTRACT

A chemical source of electrical energy may include a positive electrode (cathode) made of an electrically conductive material, a mixture of lithium sulphide and sulphur, a permeable separator or membrane, and a negative electrode (anode) made of an electrically conductive material or a material that is able reversibly to intercalate lithium ions, wherein an aprotic electrolyte comprising at least one lithium salt in at least one solvent is provided between the electrodes.

16 Claims, 2 Drawing Sheets

U.S. PATENT DOCUMENTS

| | | | |
|---|---|---|---|
| 4,303,748 | A | 12/1981 | Armand et al. |
| 4,499,161 | A | 2/1985 | Foos |
| 4,550,064 | A | 10/1985 | Yen et al. |
| 4,690,877 | A | 9/1987 | Gabano et al. |
| 4,725,927 | A | 2/1988 | Morimoto et al. |
| 4,740,436 | A | 4/1988 | Kobayashi et al. |
| 5,079,109 | A | 1/1992 | Takami et al. |
| 5,219,684 | A | 6/1993 | Wilkinson et al. |
| 5,460,905 | A | 10/1995 | Skotheim |
| 5,462,566 | A | 10/1995 | Skotheim |
| 5,529,860 | A | 6/1996 | Skotheim et al. |
| 5,582,623 | A | 12/1996 | Chu |
| 5,587,253 | A | 12/1996 | Gozdz et al. |
| 5,648,187 | A | 7/1997 | Skotheim |
| 5,789,108 | A | 8/1998 | Chu |
| 5,814,420 | A * | 9/1998 | Chu ............................ 429/104 |
| 5,919,587 | A | 7/1999 | Mukherjee et al. |
| 5,961,672 | A | 10/1999 | Skotheim et al. |
| 5,962,171 | A | 10/1999 | Boguslavsky et al. |
| 6,030,720 | A | 2/2000 | Chu et al. |
| 6,090,504 | A | 7/2000 | Sung et al. |
| 6,117,590 | A | 9/2000 | Skotheim et al. |
| 6,174,621 | B1 | 1/2001 | Skotheim et al. |
| 6,201,100 | B1 | 3/2001 | Gorkovenko et al. |
| 6,245,465 | B1 | 6/2001 | Angell et al. |
| 6,302,928 | B1 | 10/2001 | Xu et al. |
| 6,319,633 | B1 | 11/2001 | Ikeda et al. |
| 6,613,480 | B1 | 9/2003 | Hwang et al. |
| 6,632,573 | B1 | 10/2003 | Nimon et al. |
| 6,706,449 | B2 | 3/2004 | Mikhaylik et al. |
| 6,733,924 | B1 | 5/2004 | Skotheim et al. |
| 6,797,428 | B1 | 9/2004 | Skotheim et al. |
| 2002/0039677 | A1* | 4/2002 | Iwamoto et al. ............. 429/122 |
| 2002/0102466 | A1 | 8/2002 | Hwang et al. |
| 2002/0192557 | A1 | 12/2002 | Choi et al. |
| 2004/0101753 | A1* | 5/2004 | Hwang ..................... 429/218.1 |
| 2004/0157132 | A1 | 8/2004 | Kim et al. |
| 2004/0219428 | A1* | 11/2004 | Nagayama ............... 429/218.1 |
| 2006/0024579 | A1 | 2/2006 | Kolosnitsyn et al. |
| 2006/0121355 | A1 | 6/2006 | Kolosnitsyn et al. |
| 2006/0177741 | A1 | 8/2006 | Kolosnitsyn et al. |

FOREIGN PATENT DOCUMENTS

| | | |
|---|---|---|
| EP | 0710995 | 3/2001 |
| EP | 0764489 | 2/2002 |
| JP | 59194361 | 11/1984 |
| JP | 08069812 | 3/1996 |
| JP | 08138650 | 5/1996 |
| JP | 08-298229 | 11/1996 |
| JP | 08-298230 | 11/1996 |
| JP | 09-147913 | 6/1997 |
| JP | 10284076 | 10/1998 |
| WO | WO 01/97304 | 12/2001 |

OTHER PUBLICATIONS

U.S. Appl. No. 60/721,062, filed Sep. 28, 2005, Kolosnitsyn et al.

Bach et al., J. Power Sources, 1993, 43-44, 569-575.

Tarascon and Guyomard, J. Electrochem. Soc., 1991, 138, 2864-2868.

UK Search Report under Section 17 taken from Application No. GB 0416708.6.

Ein-Eli et al., J. Electrochem. Soc., 1997, 144, L205-1207.

Ein-Eli et al., J. Electrochem. Soc., 1996, 143, L273-277.

International Search Report for PCT/GB2005/002850 mailed Aug. 25, 2005.

J. Broadhead, T. Skotheim: "A safe, fast-charge, two-volt lithium/polymer cathode 'AA'-size cell with a greater than 250 Wh kg-1 energy density", Journal of Power Sources, 65 (1997), 1-2, 213-218.

Zhong et al., J. Electrochem. Soc., 1997, 144, 205-213.

International Search Report and Written Opinion of Application No. PCT/GB2006/001020 Mailed Sep. 28, 2006.

UK Search Report of Application No. GB 0505790.6 Searched Apr. 15, 2005.

Office Action of corresponding CN Application No. 200680005677.8, Mailing Date Sep. 5, 2008.

Rauh R.D., Shuker F.S., Marston J.M., Brummer S.B. "Formation if Lithium Polysulphides in Aprotic Media" J. inorg. Nucl. Chem. —1977.—V.39.—pp. 1761-1766.

Chang D.-R.; Lee S.-H.; Kim S.-W.; Kim H.-T. "Binary Electrolyte Based on Tetra (Ethylene Glycol) Dimethyl Ether and 1,3-Dioxolane for Lithium-Sulfur Battery" Journal of Power Sources, vol. 112, No. 2, Nov. 14, 2002, pp. 452-460.

Rauh, R.D., et al.: "A Lithium/Dissolved Sulphur Battery with an Organic Electrolyte", J. Electrochem.Soc. 1979, vol. 126, No. 4, pp. 523-527.

Peled E., et al.: "Rechargeable Lithium-Sulphur Battery (extended abstract)", J. of Power Sources, 1989, vol. 26, pp. 269-271.

Aurbach et al. "A Short Review of Failure Mechanisms of Lithium Metal and Lithiated Graphite Anodes in Liquid Electrolyte Solutions"; Solid State Lonics; 2002; vol. 148; pp. 405-416.

J. Paris, V. Plichon, "Electrochemical Reduction of Sulphur in Dimethylacetamide", Electrochimica Acta, 1981, vol. 26, No. 12, pp. 1823-1829.

Shin-Ichi Tobishima, Hideo Yamamoto, Minoru Matsuda, "Study on The Reduction Species of Sulphur by Alkali Metals in Nonaqueous Solvents", Electrochimica Acta, 1997, vol. 42, No. 6, pp. 1019-1029.

Taitiro Fujnaga, Tooru Kuwamoto, Satoshi Okazaki, Masashi Horo, "Electrochemical reduction of elemental sulphur in acetonitrile", Bull. Chem. Soc. Jpn., 1980, vol. 53, pp. 2851-2855.

Levillain E., Gaillard F., Leghie P., Demortier A., Lelieur J.P., "On the understanding of the reduction of sulphur ($S_8$) in dimethylformamide (DMF)", J. of Electroanalytical Chemistry, 1997, vol. 420, pp. 167-177.

Yamin H., Penciner J., Gorenshtain A., Elam M., Peled E., "The electrochemical behavior of polysulphides in tetrahydrofuran", J. of Power Sources, 1985, vol. 14, pp. 129-134.

Yamin H., Gorenshtein A., Penciner J., Sternberg Y., Peled E., "Lithium sulphur battery. Oxidation/reduction mechanisms of polysulphides in THF solution", J. Electrochem. Soc., 1988, vol. 135, No. 5, pp. 1045-1048.

Yamin H., Peled E., "Electrochemistry of a nonaqueous lithium/sulphur cell", J. of Power Sources, 1983, vol. 9, pp. 281-287.

Peled E., Sternberg Y., Gorenshtein A., Lavi Y., "Lithium-sulphur battery: evaluation of dioxolane-based electrolytes", J. Electrochem. Soc., 1989, vol. 136, No. 6, pp. 1621-1625.

* cited by examiner

LITHIUM SULPHIDE BATTERY AND METHOD OF PRODUCING THE SAME

RELATED APPLICATION DATA

The present application claims priority from prior provisional application No. 60/664,592, filed on Mar. 24, 2005, entitled "LITHIUM SULPHIDE BATTERY AND METHOD OF PRODUCING THE SAME", and in addition prior UK patent application number 0505790.6 filed on Mar. 22, 2005, both of which are incorporated by reference herein in their entirety.

TECHNICAL FIELD

The present invention relates to electrochemical power engineering, and in particular to chemical sources of electrical energy (batteries) comprising a negative electrode (anode) utilizing the oxidation-reduction pair $Li^+/Li^0$, a positive electrode (cathode) utilizing the oxidation-reduction pair $S^0/S^{-2}$, and a non-aqueous aprotic electrolyte. Embodiments of the invention also relate to the composition of the depolarizer substance of the positive electrode.

BACKGROUND OF THE INVENTION

Throughout this application various patents and published patent applications are referred to by an identifying citation. The disclosures of the patents and published patent applications referred to in this application are hereby incorporated into the present disclosure by reference to more fully describe the state of the art to which this invention pertains.

An electroactive material that has been fabricated into a structure for use in a battery is referred to as an electrode. Of a pair of electrodes used in a battery, herein referred to as a chemical source of electrical energy, the electrode on the side having a higher electrochemical potential is referred to as the positive electrode, or the cathode, while the electrode on the side having a lower electrochemical potential is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. A chemical source of electrical energy or battery comprising a cathode with the cathode active material in an oxidized state and an anode with the anode active material in a reduced state is referred to as being in a charged state. Accordingly, a chemical source of electrical energy comprising a cathode with the cathode active material in a reduced state, and an anode with the anode active material in an oxidized state, is referred to as being in a discharged state.

There is a significant requirement for new types of rechargeable batteries, having high specific energy, long cycle life, safety for the user and the environment, as well as low cost. One of the most promising electrochemical systems is the lithium-sulphur system, which has high theoretical specific energy (2600 Wh/kg), safety and low cost. Sulphur or sulphur-based organic and polymeric compounds are used in lithium-sulphur batteries as a positive electrode depolarizer substance. Lithium or lithium alloys are used as depolarizer substances in the negative electrode.

Elemental sulphur (U.S. Pat. No. 5,789,108; U.S. Pat. No. 5,814,420), sulphur-based organic compounds (U.S. Pat. No. 6,090,504) or sulphur-containing polymers (U.S. Pat. No. 6,201,100, U.S. Pat. No. 6,174,621, U.S. Pat. No. 6,117,590) usually serve as a depolarizer for the positive electrode in lithium-sulphur batteries. Metallic lithium is normally used as a material for the negative electrode (U.S. Pat. No. 6,706,449). It has been suggested that it might be possible to make use of materials that can reversibly intercalate lithium for the negative electrode material. These materials include graphite (D. Aurbach, E. Zinigrad, Y. Cohen, H. Teller; "A short review of failure mechanism of lithium metal and lithiated graphite anodes in liquid electrolyte solutions"; Solid State Ionics; 2002; vol 148; pp 405-416), and oxides and sulphides of some metals (U.S. Pat. No. 6,319,633). However, the present applicant has not been able to find specific examples of intercalation electrodes for lithium-sulphur batteries in the available literature. It must be stressed out that it is only possible to use intercalation electrodes (negative or positive) when they are present in lithiated form. It is also necessary to take into account that intercalated compounds (where lithium is involved) are chemically active and have chemical properties close to the properties of metallic lithium.

One of the disadvantages of lithium-sulphur batteries (limiting their commercialization) is a moderate cycle life caused by a low cycling efficiency of the lithium electrode. Accordingly, twice to ten times the theoretically required amount of lithium is usually provided in lithium-sulphur batteries so as to provide a longer cycle life. In order to improve cycling of the lithium electrode, it has been proposed to add various compounds to the electrolyte (U.S. Pat. No. 5,962,171, U.S. Pat. No. 6,632,573) or to deposit protective layers of polymers (U.S. Pat. No. 5,648,187, U.S. Pat. No. 5,961,672) or non-organic compounds (U.S. Pat. No. 6,797,428, U.S. Pat. No. 6,733,924) on the electrode surface. The use of protective coatings significantly improves the cycling of the lithium electrode but still does not provide a sufficiently long cycle life for many commercial applications.

It is known that graphite intercalate electrodes possess good cycling capabilities (D. Aurbach, E. Zinigrad, Y. Cohen, H. Teller; "A short review of failure mechanism of lithium metal and lithiated graphite anodes in liquid electrolyte solutions"; Solid State Ionics; 2002; vol 148; pp 405-416). However, in order to use such electrodes as a negative electrode, it is necessary to have a source of lithium ions. In traditional lithium-ion batteries, this may be lithiated oxides of transition metals, cobalt, nickel, manganese and others that are depolarizers for the positive electrode.

It is theoretically possible to use the end products of sulphur electrode discharge (lithium sulphide and disulphide) as the source of lithium ions. However, lithium sulphide and disulphide are poorly soluble in aprotic electrolyte systems, and are thus electrochemically non-active. Attempts to use lithium sulphide as a depolarizer for the positive electrode in lithium-sulphur batteries have hitherto been unsuccessful (Peled E., Gorenshtein A., Segal M., Sternberg Y.; "Rechargeable lithium-sulphur battery (extended abstract)"; J. of Power Sources; 1989; vol 26; pp 269-271).

Lithium sulphide is capable of reacting with elemental sulphur in aprotic media so as to produce lithium polysulphides, these being compounds that have good solubility in most known aprotic electrolyte systems (AES) (Shin-Ichi Tobishima, Hideo Yamamoto, Minoru Matsuda, "Study on the reduction species of sulphur by alkali metals in nonaqueous solvents", Electrochimica Acta, 1997, vol 42, no 6, pp 1019-1029; Rauh R. D., Shuker F. S., Marston J. M., Brummer S. B., "Formation of lithium polysulphides in aprotic media", J. inorg. Nucl. Chem., 1977, vol 39, pp 1761-1766; J. Paris, V. Plichon, "Electrochemical reduction of sulphur in dimethylacetamide", Electrochimica Acta, 1981, vol 26, no 12, pp 1823-1829; Rauh R. D., Abraham K. M., Pearson G. F., Surprenant J. K., Brummer S. B., "A lithium/dissolved sulphur battery with an organic electrolyte", J. Electrochem. Soc., 1979, vol 126, no 4, pp 523-527). The solubility of lithium polysulphides in an aprotic electrolyte system depends on the properties of the components (solvents and salts) thereof, as well as on the length of the polysulphide chain. Lithium polysulphides may undergo disproportionation in solutions according to the following schema:

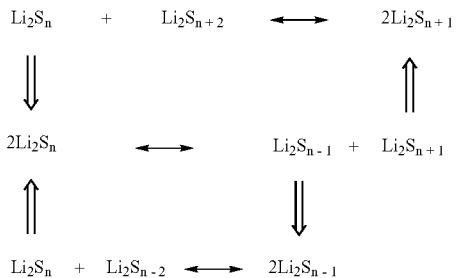

Accordingly, lithium polysulphides of various lengths may be found simultaneously in the electrolyte solution at the same time, being in thermodynamic equilibrium with each other. A molecular mass distribution of the polysulphides is governed by the composition and physical/chemical properties of the electrolyte solution components. These solutions of lithium polysulphides possess high electroconductivity (Duck-Rye Chang, Suck-Hyun Lee, Sun-Wook Kim, Hee-Tak Kim "Binary electrolyte based on tetra(ethylene glycol) dimethyl ether and 1,3-dioxolane for lithium-sulphur battery", J. of Power Sources, 2002, vol 112, pp 452-460) and high electrochemical activity (Taitiro Fujnaga, Tooru Kuwamoto, Satoshi Okazaki, Masashi Horo, "Electrochemical reduction of elemental sulphur in acetonitrile", Bull. Chem. Soc. Jpn., 1980, vol 53, pp 2851-2855; Levillain E., Gaillard F., Legit P., Demortier A., Lelieur J. P., "On the understanding of the reduction of sulphur ($S_8$) in dimethylformamide (DMF)", J. of Electroanalytical Chemistry, 1997, vol 420, pp 167-177; Yamin H., Penciner J., Gorenshtain A., Elam M., Peled E., "The electrochemical behavior of polysulphides in tetrahydrofuran", J. of Power Sources, 1985, vol 14, pp 129-134; Yamin H., Gorenshtein A., Penciner J., Sternberg Y., Peled E., "Lithium sulphur battery. Oxidation/reduction mechanisms of polysulphides in THF solution", J. Electrochem. Soc., 1988, vol 135, no 5, pp 1045-1048).

It has been proposed to use polysulphide solutions in AES as liquid depolarizers for lithium-sulphur batteries (Rauh R. D., Abraham K. M., Pearson G. F., Surprenant J. K., Brummer S. B., "A lithium/dissolved sulphur battery with an organic electrolyte", J. Electrochem. Soc., 1979, vol 126, no 4, pp 523-527; Yamin H., Peled E., "Electrochemistry of a non-aqueous lithium/sulphur cell", J. of Power Sources, 1983, vol 9, pp 281-287). Such batteries are generally known as "lithium-sulphur batteries with liquid cathodes". The degree of sulphur utilization in such batteries with liquid sulphide cathodes depends on the nature and polarization conditions of the AES. In many cases it is close to 100% if counting full sulphur reduction and lithium sulphide formation (Rauh R. D., Abraham K. M., Pearson G. F., Surprenant J. K., Brummer S. B., "A lithium/dissolved sulphur battery with an organic electrolyte", J. Electrochem. Soc., 1979, vol 126, no 4, pp 523-527). An energy output of liquid cathodes based on lithium polysulphides is determined by their solubility. In some solvents (tetrahydrofuran, for example) sulphur solubility in the form of lithium polysulphides can reach 20M (Yamin H., Peled E., "Electrochemistry of a nonaqueous lithium/sulphur cell", J. of Power Sources, 1983, vol 9, pp 281-287). The energy output of such liquid cathodes is more than 1000 Ah/l. The cycle life of lithium-sulphur batteries is also determined by the metal lithium electrode behaviour and is limited by the cycling efficiency of this electrode, which is about 80-90% in sulphide systems (Peled E., Sternberg Y., Gorenshtein A., Lavi Y., "Lithium-sulphur battery: evaluation of dioxolane-based electrolytes", J. Electrochem. Soc., 1989, vol 136, no 6, pp 1621-1625).

SUMMARY

Investigations made by the present applicant have shown that the cycle life of lithium-sulphur batteries with liquid cathodes could be improved by using graphite as the negative electrode. But in this case a source of lithium ions is needed. Solutions of long-chain polysulphides ($Li_2S_n$, where $n \geq 8$) are normally used as liquid sulphur cathodes. In such molecules, eight or more atoms of sulphur are due to one ion of lithium. Accordingly the cycling depth of lithium-sulphur batteries with liquid cathodes will be low and is determined by the length of the polysulphide chain. Reducing the length of the lithium polysulphide chains will increase the cycling depth of lithium-sulphur batteries with a liquid cathode based on lithium sulphides. However, the shorter the chain lengths of the lithium polysulphides, the lower their solubility in an aprotic electrolyte system, and hence the energy output of the liquid sulphide cathode is decreased.

The present applicant has found that a solution of lithium polysulphides will be formed during contact of an aprotic electrolyte system with a mixture of lithium sulphide with sulphur. The concentration of the polysulphides in the solution and the length of the polysulphide chains will be determined on the one hand by the molar ratio between lithium sulphide and sulphur, and on the other hand by the nature of the aprotic electrolyte system. Generally, complete dilution of sulphide will not occur in the presence of a small quantity of sulphur. However, during charging of the cell accompanied by oxidation of soluble polysulphides to elemental sulphur, further dilution of lithium sulphide will occur as a result of the reaction with the generated sulphur until complete dilution of the lithium sulphide.

According to a first aspect of the present invention, there is provided a chemical source of electrical energy comprising a positive electrode (cathode) made of an electrically conductive material, a permeable separator or membrane, a negative electrode (anode) made of an electrically conductive material or a material that is able reversibly to intercalate lithium ions, and a mixture of lithium sulphide and sulphur, wherein an aprotic electrolyte comprising at least one lithium salt in at least one solvent is provided between the electrodes.

The mixture of lithium sulphide with elemental sulphur serves as a positive electrode depolariser substance (electroactive substance) and addresses the problems (cycle life and manufacturing costs) inherent in using a material that can reversibly intercalate lithium ions as the negative electrode.

The lithium sulphide/sulphur mixture may be incorporated directly in the positive electrode during its manufacture, or may be provided as a colloid solution or suspension added to the electrolyte, or a semi-solid emulsion, ointment or powder composition.

The positive electrode is preferably porous, highly electrically-conductive and advantageously has a developed surface.

In other embodiments, the positive electrode may have a substantially or generally smooth surface, and/or be of a non-porous configuration or construction.

The positive electrode may be made of carbon or graphite, or of a metallic or other, preferably highly, electrically conductive material (optionally with high porosity) that is resistant to corrosion in sulphide media. Semconductive or semiconductor materials, such as silicon, may alternatively or additionally be used to fabricate the positive electrode.

The permeable separator or membrane may be made of a porous film or non-woven material, for example microporous polypropylene (Celgard® separator) or non-woven polypropylene.

Where the lithium sulphide/sulphur mixture is provided in the form of a suspension or colloid, the solids content of the suspension or colloid is preferably from 5 to 50%. The content of lithium sulphide in the colloid or suspension is preferably from 10 to 99%, or 10 to 90%, by weight of the content of sulphur.

The aprotic electrolyte may comprise a solution of one or more of: lithium trifluoromethanesulphonate, lithium perchlorate, lithium trifluoromethanesulphonimide, lithium hexafluorophosphate, lithium hexafluoroarsenate, lithium tetrachloroaluminate, lithium tetraalkylammonium salt, lithium chloride, lithium bromide, and lithium iodide in one or several solvents selected from the group consisting of: dioxolane, tetrahydrofuran, dimethoxyethane, diglyme, triglyme, tetraglyme, dialkyl carbonates, sulfolane, and butyrolactone.

According to a second aspect of the present invention, there is provided a method of manufacturing a chemical source of electrical energy, the method comprising the steps of:
i) providing a cathode;
ii) providing a mixture of lithium sulphide and sulphur in an aprotic electrolyte comprising at least one lithium salt in at least one solvent;
iii) applying a coating of the mixture to the cathode;
iv) applying a permeable separator or membrane over the coated cathode;
v) applying a coating of an aprotic electrolyte comprising at least one lithium salt in at least one solvent over the permeable separator or membrane;
vi) providing an anode on the coating of aprotic electrolyte, the anode being made of an electrically conductive material or a material that is able reversibly to intercalate lithium ions;
vii) providing terminal connections for the anode and cathode and hermetically sealing the structure obtained by the steps of the method.

The cathode may have a developed or roughened or smooth surface. Preferably the cathode is porous, but in some embodiments the cathode is non-porous.

The mixture of lithium sulphide and sulphur is preferably applied as a suspension, colloid, semi-solid emulsion, ointment or powder.

In step v), the aprotic electrolyte may optionally also contain a mixture of lithium sulphide and sulphur as in step ii), or it may be free of a mixture of lithium sulphide and sulphur.

The structure may be folded or shaped as desired prior to sealing.

An important distinction of embodiments of the present invention over the prior art is that the positive electrodes (cathodes) of the prior art all comprise sulphur-containing components (sulphur, metal sulphides, organic sulphur compounds including polymers) which directly form the cathode. In other words, these sulphur-containing components are intrinsically bound up in the cathode. In embodiments of the present invention, in contrast, a mixture (e.g. a colloid solution, suspension, semi-solid emulsion or ointment, or powder) of lithium sulphide and sulphur in an aprotic electrolyte is coated onto or applied to an electron conductive inert material (e.g. carbon, graphite, metal, silicon). No sulphur-containing components are intrinsically bound up in the cathode. In particular, the prior art does not disclose a cell in which a mixture of lithium sulphide and sulphur in an aprotic electrolyte is coated onto or applied to the cathode and in which a permeable separator or membrane is then placed over the coating.

Moreover, embodiments of the present invention utilise a different electrochemical process from known prior art systems. In the prior art systems, the anode is formed from lithium, lithium alloys or other materials containing lithium ions from the outset, and the cathode is made from sulphur-containing components from the outset. The cell reaction is of the form $xLi+S=Li_xS$. In embodiments of the present invention, the anode from the outset does not contain metallic lithium or lithium ions. Lithium ions only become incorporated in the anode upon charging the cell. Likewise, the cathode contains no sulphur from the outset. In simple terms, the lithium-sulphide system of embodiments of the present invention has a cycle starting at the point where the cycle of existing lithium-sulphur cells ends, and in which lithium is oxidised at the anode and sulphur is reduced at the cathode during discharge.

BRIEF DESCRIPTION OF THE DRAWINGS

For a better understanding of the present embodiments and to show how they may be carries into effect, reference shall now be made by way of example to the accompanying drawings, in which.

DETAILED DESCRIPTION OF THE INVENTION

Figure 1:
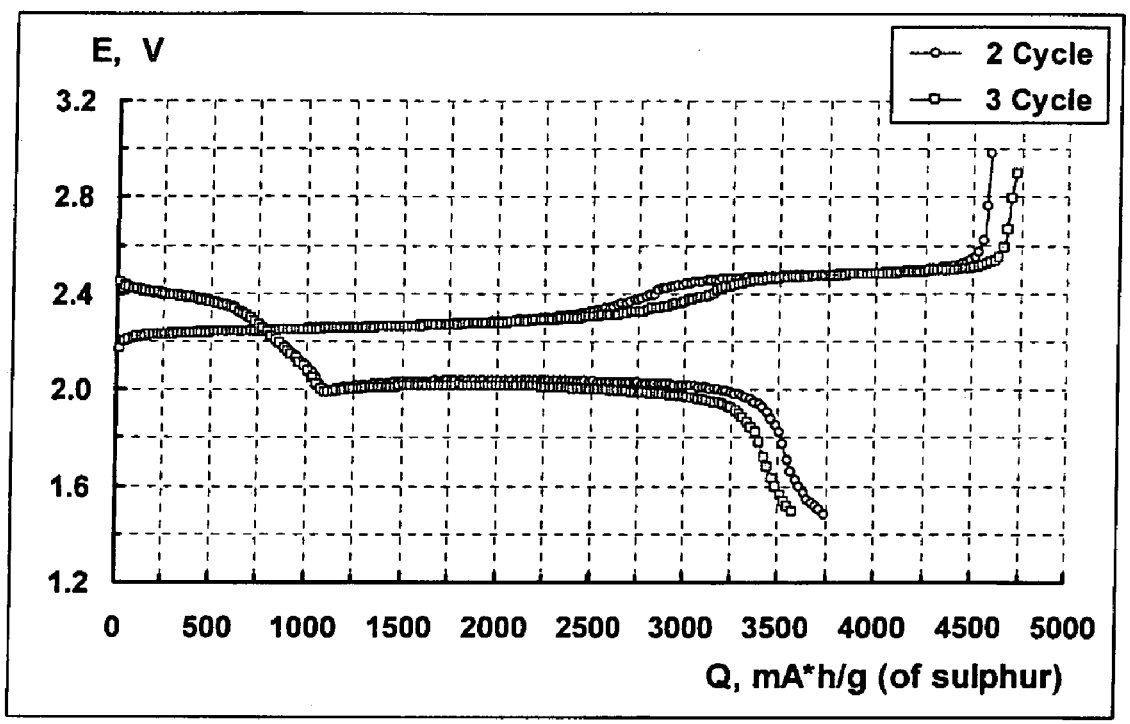
FIG. 1 shows a charge-discharge plot for a first embodiment.

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

It is known that lithium sulphide, in the presence of aprotic solvents, reacts with sulphur to produce lithium polysulphides of various lengths:

$$Li_2S_{solid} + nS_{solid} \xrightarrow{\text{Aprotic Solvent}} Li_2S_{n\ solution}$$

Lithium polysulphides are well soluble in most known aprotic electrolyte systems and possess high electrochemical activity. In solution, they undergo multi-step dissociation:

$$Li_2S_n \rightarrow Li^+ + LiS^-_n$$

$$LiS^-_n \rightarrow Li^+ + S^{2-}_n$$

During charging of a cell comprising a mixture of lithium sulphide with sulphur constructed according to the scheme:

Inert electrode/$Li_2S+nS$+salt solution/Inert electrode there will take place a reaction of lithium reduction on the negative electrode:

$Li^+ + e \rightarrow Li^0$ and a reaction of sulphur oxidation at the positive electrode:

$S_n^{-2} - 2e \rightarrow nS$

During discharging of the cell, the reverse reactions will take place on the electrodes.
At the negative electrode:

$Li^0 - e \rightarrow Li^+$

At the positive electrode:

$nS - 2ne \rightarrow nS^{-2}$

The power intensity and cycling efficiency of such a cell will be strongly affected by the molar ratio of lithium sulphide and sulphur. On the one hand this ratio has to provide a high energy density, and on the other hand it has to provide a long cycle life.

EXAMPLE 1

Lithium sulphide, 98% (Sigma-Aldrich, UK) and sublimated sulphur, 99.5% (Fisher Scientific, UK) were ground at a mass ratio of 90:10 in a high speed mill (Microtron MB550) for 15 to 20 minutes in an atmosphere of dry argon (moisture content 20-25 ppm). The ground mixture of lithium sulphide and sulphur was placed into a flask and an electrolyte was added to the flask. A 1M solution of lithium trifluoromethanesulphonate (available from 3M Corporation, St. Paul, Minn.) in sulfolane (99.8%, standard for GC available from Sigma-Aldrich, UK) was used as the electrolyte. The liquid to solid mass ratio was 10:1. The content of the flask was mixed for 24 hours by means of a magnetic stirrer at room temperature. The liquid phase was separated from the non-dissolved solid phase by filtration. Then the sulphur in the form of sulphides and the total sulphur content were analysed. The content of the total sulphur in the initial electrolyte was also analysed and taken into account.

The Analysis Results:

| | |
|---|---|
| The total sulphur content in the initial electrolyte, % by mass | 25.8 ± 0.1 |
| The total sulphur content in the electrolyte after the reaction with the mixture of sulphur and lithium sulphide, % | 26.9 ± 0.1 |
| Content of sulphide sulphur in the electrolyte after the reaction with the mixture of sulphur and lithium sulphide, % | 0.18 ± 0.015 |

The results of the analysis enabled the composition of lithium polysulphides to be calculated after the reaction of lithium sulphide and sulphur in electrolyte as well as the concentration of lithium polysulphide in electrolyte.

Calculation Results:

| | |
|---|---|
| Polysulphide composition: | $Li_2S_{6.1}$ |
| Concentration: | 0.18% |

EXAMPLE 2

The solution of polysulphides in electrolyte was prepared as described in the Example 1 (1M solution of lithium trifluoromethanesulphonate in sulpholane) and the total amount of sulphur and sulphide was chemically analyzed. The mass ratio of $Li_2S$:S was 50:50.

The Analysis Results:

| | |
|---|---|
| The total sulphur content in the initial electrolyte, % by mass | 25.8 ± 0.1 |
| The total sulphur content in the electrolyte after the reaction with the mixture of the sulphur and lithium sulphide, % | 31.8 ± 0.1 |
| The content of sulphide sulphur in electrolyte after the reaction with the mixture of sulphur and lithium sulphide, % | 0.96 ± 0.05 |

The content and the composition of lithium polysulphides in the electrolyte after the reaction of lithium sulphide with sulphur were calculated based on the analysis results.

Calculation Results:

| | |
|---|---|
| Polysulphide composition: | $Li_2S_{6.25}$ |
| Concentration: | 0.96% |

EXAMPLE 3

The solution of polysulphides in electrolyte was prepared as described in the Example 1 (1M solution of lithium trifluoromethanesulphonate in sulpholane) and the amount of sulphur and sulphide sulphur was chemically analysed. The mass ratio of $Li_2S$:S was 10:90.

The Analysis Results:

| | |
|---|---|
| The total sulphur content in the initial electrolyte, % by mass | 25.8 ± 0.1 |
| The total sulphur content in electrolyte after the reaction with the mixture of sulphur and lithium sulphide, % | 29.9 |
| The content of sulphide sulphur in electrolyte after the reaction with the mixture of the sulphur and lithium sulphide, % | 0.7 |

The composition of lithium polysulphides in the electrolyte after the reaction of lithium sulphide with sulphur and the concentration of lithium polysulphide in electrolyte were calculated based on the analysis results.

Calculation Results:

| | |
|---|---|
| Polysulphide composition: | $Li_2S_{5.86}$ |
| Concentration: | 0.7% |

EXAMPLE 4

A porous electrode made up of 50% electroconductive carbon black (Ketjenblack EC-600JD, available from Akzo Nobel Polymer Chemicals BV, Netherlands) and 50% polyethylene oxide (PEO, 4,000,000 molecular weight, available from Sigma-Aldrich, UK) as a binder was prepared according to the following procedure.

A mixture of dry components was milled in a high speed grinder (Microtron MB550) for 15 to 20 minutes. Acetonitryl was then added to the mixture as a solvent for the binder. The resulting suspension was then mixed for 15 to 20 hours in a DLH laboratory stirrer. The solids content of the suspension was 5%. The suspension thus produced was deposited by an automatic film applicator (Elcometer SPRL) to one side of an 18 μm thick aluminum foil with an electroconductive carbon coating (Product No. 60303 available from Rexam Graphics, South Hadley, Mass.) as a current collector.

The carbon coating was dried in ambient conditions for 20 hours. After drying, the electrode was pressed at a pressure of 1000 kg/cm$^2$. The resulting dry cathode layer had a thickness of 8 μm after pressing and contained 0.47 mg/cm$^2$ of carbon—PEO mixture. The volume density of the carbon layer was 590 mg/cm$^3$ and the porosity was 72%.

EXAMPLE 5

A suspension comprising a mixture of lithium sulphide with sulphur in an electrolyte was produced. Lithium sulphide, 98% (Sigma-Aldrich, UK) and sublimated sulphur, 99.5% (Fisher Scientific, UK) were ground at a mass ratio of 90:10 in a high speed mill (Microtron MB550) for 15 to 20 minutes in an atmosphere of dry argon (moisture content 20-25 ppm). The ground mixture of lithium sulphide and sulphur was placed into a ball mill, and an electrolyte was added to the mill. A solution of trifluoromethanesulphonate of lithium (available from 3M Corporation, St. Paul, Minn.) in sulfolane (99.8%, standard for GC available from Sigma-Aldrich, UK) was used as the electrolyte. The liquid to solid ratio was 10:1.

EXAMPLE 6

The hard composite cathode from Example 4 was used in a small cell producing electric current with an electrode surface area of about 5 cm$^2$. The electrode was dried in a vacuum at 50° C. for 5 hours before being installed in the cell. Celgard 2500 (a trade mark of Tonen Chemical Corporation, Tokyo, Japan, and also available from Mobil Chemical Company, Films Division, Pittsford, N.Y.) was used as a porous separator. A copper foil was used as a current collector for the negative electrode.

The cell was assembled in the following way:

A thin even layer of the lithium sulphide and sulphur suspension in the electrolyte from Example 5 was deposited onto the porous carbon cathode from Example 4 in a quantity of about 7.5 mg/cm$^2$ of the cathode surface. Then one layer of Celgard 2500 was placed onto the electrode over the deposited suspension. An electrolyte comprising a solution of trifluoromethanesulphonate of lithium (available from 3M Corporation, St. Paul, Minn.) in sulfolane (99.8%, standard for GC available from Sigma-Aldrich, UK), but without any lithium sulphide-sulphur suspension, was deposited onto the separator in a quantity of 1 μl/cm$^2$. A copper current collector was placed on top of the "sandwich" structure thus produced. Finally, the cell was hermetically sealed.

The cell was kept at ambient room conditions for 24 hours and then charged at a current dencity of 0.05 mA/cm$^2$ to a voltage of 2.8V.

Thereafter, the cell was cycled. Charge and discharge was conducted at a current density of 0.1 mA/cm$^2$ with discharge termination at 1.5V and charge termination at 2.8V. The charge-discharge plots are shown in FIG. 1. The charge-discharge plots are similar to those obtained for lithium-sulphur cells using elemental sulphur as a cathode depolariser (electroactive substance). The efficiency of lithium-sulphur utilisation is 55 to 65%.

EXAMPLE 7

The solid state composite cathode from Example 3 was used in an electrochemical cell having a cathode surface area of approximately 5 cm$^2$. The electrode was dried for 5 hours under vacuum at 50° C. prior to assembly of the cell.

A porous Celgard 2500 separator was used (Tonen Chemical Corporation, Tokyo, Japan, also available from Mobil Chemical Company, Films Division, Pittsford, N.Y.).

A 20 micrometer aluminium foil was used as a current collector for the negative electrode.

The cell was assembled as follows:

A porous carbon electrode was coated with a thin uniform layer of the suspension of lithium sulphide and sulphur in electrolyte obtained as described in the Example 2 in an amount of approximately 7.5 mg per 1 sq cm. Then one layer of Celgard separator was placed on top of the electrode coated with the suspension. The electrolyte was deposited onto the separator in the quantity of 1 microlitre per 1 cm$^2$. A disk of copper foil was placed on the top. Then the cell was sealed.

The cell was kept at room temperature for 24 hours and then charged at a current density of 0.05 mA/cm$^2$ up to 2.8 V.

Figure 2:
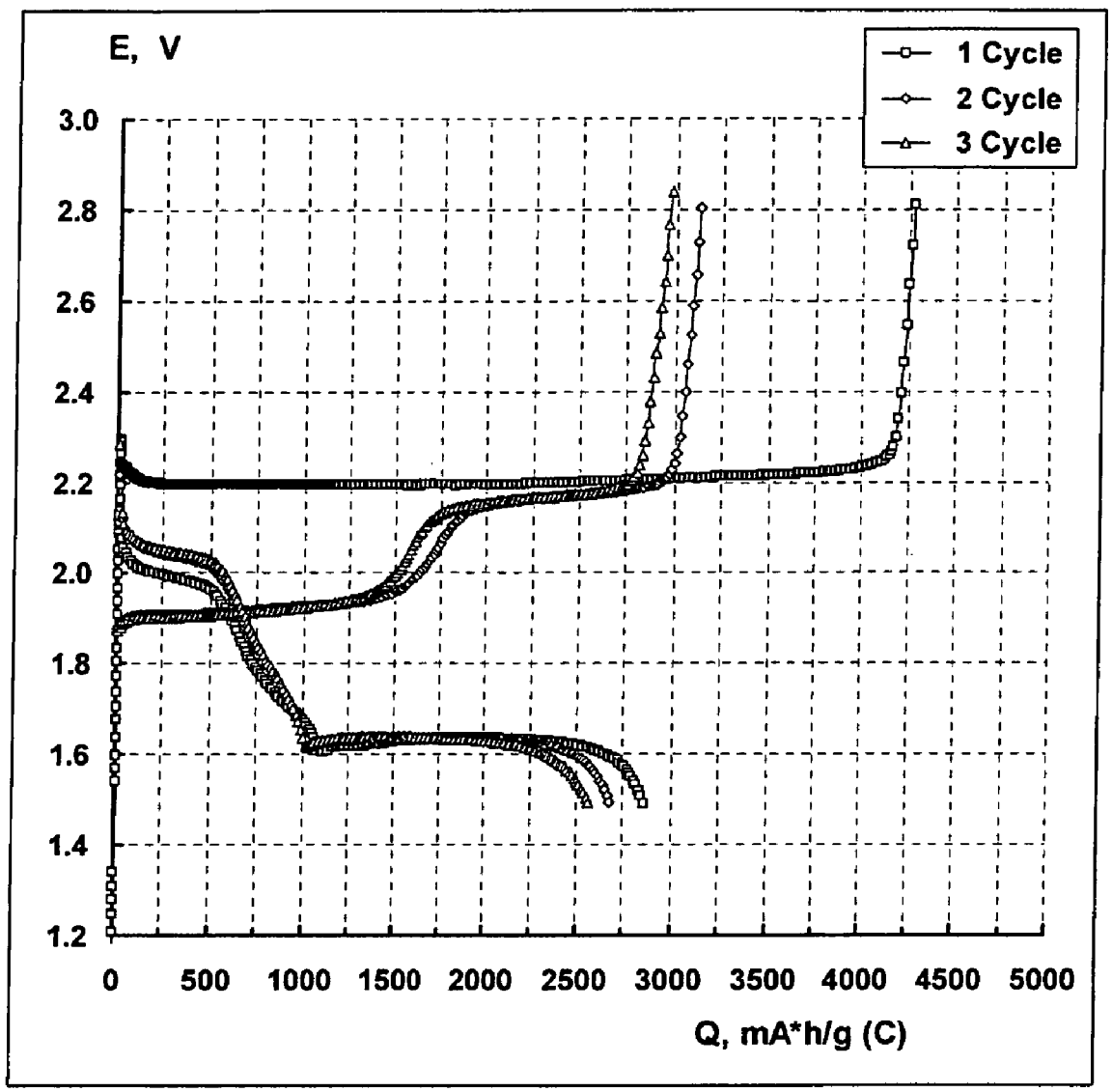
FIG. 2 shows a charge-discharge plot for a second embodiment.

Then the cell was cycled at a current density of 0.1 mA/cm$^2$, with discharge being terminated at 1.5V and charge being terminated at 2.8V. The resulting charge-discharge curves are shown in FIG. 2.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

Throughout the description and claims of this specification, the singular encompasses the plural unless the context otherwise requires. In particular, where the indefinite article is used, the specification is to be understood as contemplating plurality as well as singularity, unless the context requires otherwise.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A chemical source of electrical energy comprising:
    a positive electrode (cathode) comprising an electrically conductive material substantially free of sulphur or sulphur-containing components;
    a permeable separator;
    a negative electrode (anode) comprising a material substantially free of lithium or lithium-containing components and selected from the group consisting of an electrically conductive material and a material that is able reversibly to intercalate lithium ions;

a mixture of lithium sulphide and sulphur in a first aprotic electrolyte comprising at least one lithium salt in at least one solvent, the mixture provided as a colloid solution or a suspension or a semi-solid emulsion or an ointment and disposed between the positive electrode and the permeable separator; and a second aprotic electrolyte comprising at least one lithium salt in at least one solvent provided between the permeable separator and the negative electrode;

wherein the electrodes, permeable separator and electrolytes are contained within a cell and upon application of a charge to the cell, the positive electrode incorporates sulphide ions from the first aprotic electrolyte and the negative electrode incorporates lithium ions from the second aprotic electrolyte.

2. A chemical source of electrical energy as claimed in claim 1, wherein the positive electrode is porous.

3. A chemical source of electrical energy as claimed in claim 1, wherein the positive electrode is non-porous 4. A chemical source of electrical energy as claimed in claim 1, wherein the positive electrode comprises carbon.

5. A chemical source of electrical energy as claimed in claim 1, wherein the positive electrode comprises a material selected from the group consisting of graphite, a metallic material that is resistant to corrosion in sulphide media, and a semiconductive material.

6. A chemical source of electrical energy as claimed in claim 1, wherein the permeable separator comprises porous material.

7. A chemical source of electrical energy as claimed in claim 1, wherein the mixture has a solids content of 5% to 50%.

8. A chemical source of electrical energy as claimed in claim 1, wherein the content of lithium sulphide in the mixture is from 10% to 99% by weight of the content of sulphur.

9. A chemical source of electrical energy as claimed in claim 6, wherein the porous material is woven.

10. A chemical source of electrical energy as claimed in claim 6, wherein the porous material is non-woven.

11. A chemical source of electrical energy as claimed in claim 1, wherein the first and second aprotic electrolytes comprises a solution of one or more of: lithium trifluoromethanesulphonate, lithium perchlorate, lithium trifluoromethanesulphonimide, lithium hexafluorophosphate, lithium hexafluoroarsenate, lithium tetrachloroaluminate, lithium tetraalkylammonium salt, lithium chloride, lithium bromide, and lithium iodide dissolved in one or several solvents selected from the group consisting of: dioxolane, tetrahydrofuran, dimethoxyethane, diglyme, triglyme, tetraglyme, dialkyl carbonates, sulfolane, and butyrolactone.

12. A chemical source of electrical energy as claimed in claim 1, wherein the first and second aprotic electrolytes are different from each other.

13. A chemical source of electrical energy as claimed in claim 1, wherein the first aprotic electrolyte is the same as the second aprotic electrolyte.

14. A chemical source of electrical energy comprising:

a positive electrode (cathode) comprising an electrically conductive material substantially free of sulphur or sulphur-containing components;

a negative electrode (anode) comprising a material substantially free of lithium or lithium-containing components and selected from the group consisting of an electrically conductive material and a material that is able reversibly to intercalate lithium ions;

a permeable separator disposed between the positive electrode and the negative electrode;

a mixture of lithium sulphide and sulphur in an aprotic electrolyte comprising at least one lithium salt in at least one solvent, the mixture provided as a colloid solution or a suspension or a semi-solid emulsion or an ointment and disposed between the positive electrode and the negative electrode; and wherein the electrodes, permeable separator and electrolyte are contained within a cell and upon application of a charge to the cell, the positive electrode incorporates sulphide ions from the aprotic electrolyte and the negative electrode incorporates lithium ions from the aprotic electrolyte.

15. The chemical source of electrical energy of claim 14, wherein upon application of a charge to the cell, the positive electrode further incorporates one or more of elemental sulphur, lithium sulphide and lithium polysulphides.

16. The chemical source of electrical energy of claim 12, wherein upon application of a charge to the cell, the positive electrode further incorporates one or more of elemental sulphur, lithium sulphide and lithium polysulphides.

* * * * *